Patented Apr. 8, 1930

1,753,531

UNITED STATES PATENT OFFICE

ROBERT K. PRINCE, OF WESTFIELD, MASSACHUSETTS, ASSIGNOR TO VITAMIN FOOD CO. INC., OF NEW YORK, N. Y., A CORPORATION OF DELAWARE

VITAMIN COMPOUND

No Drawing. Application filed January 2, 1925, Serial No. 281. Renewed October 8, 1928.

The object of my invention is the production of a pharmaceutical composition containing vitamins, inorganic salts and duct and ductless glandular substances which I have discovered have, in combination, a mutual physiological reaction as will hereinafter be more fully pointed out. This composition may take the forms of powder, compressed tablets or wafers, capsules, solutions or extracts and emulsions.

In preparing my composition, I prefer to use the following ingredients. As a source of the A vitamin:—dehydrated vegetables, cod liver oil, dehydrated whole milk or a suitably prepared vegetable oil. As a source of the B vitamin:—dehydrated vegetables, live or quiescent yeast or autolyzed yeast or an autolyzed yeast extract or a dehydrated autolyzed yeast extract. As a source of C vitamin:—dehydrated vegetables, dehydrated, concentrated or natural citrus fruit juices. As inorganic salts:—tri-calcium phosphate, sea salt, calcium lactate, etc.

The endocrines or glandular substances used are: thyroid, orchitic, prostate, pituitary, pancreas, mammary glands, liver substance.

I realize, however, that other materials may be used as the source of vitamins and hormones and other inorganic salts may be used. I do not, therefore, intend to limit myself specifically, to the embodiment here disclosed. I desire to protect my invention broadly in whatever form its principle may be utilized.

A typical composition would consist of 1.5% orchitic substance, 5.6% dehydrated citrus fruit juices, .2 of 1% sodium iodide, 11.7% tri-calcium phosphate, 16.8% dehydrated autolyzed yeast extract, 64.2% dehydrated whole milk powder.

In combination the ingredients of my compound have a mutual physiological reaction, as follows:—

It has been frequently demonstrated that the A vitamin functions more effectively when administered in the presence of sufficient quantity of B vitamin and conversely the B vitamin functions more effectively in the presence of a suitable quantity of A vitamin. In much the same manner, I have discovered that the activity of all three vitamins when administered together is markedly increased when administered with suitable endocrines, the hormones in the endocrines causing the action of the vitamins to be more effective. In a similar way, I have found that the addition of vitamins to endocrine material containing hormones stimulates the action obtained from the hormones.

It is to be noted that among the inorganic salts used, I have indicated a small percentage of sodium iodide. This is a highly inorganic salt and, as known, a person cannot live without small quantities of iodine in his food. If sodium iodide were introduced into the formula in the absence of organic material, it would soon become decomposed with a resulting loss of iodine. As a result of introducing autolyzed yeast, however, as decomposition of the sodium iodide takes place, the iodine unites with the protein of the autolyzed yeast. I have discovered that a protein combination of iodine is a more effective compound in which to introduce iodine into the food than is the use of the inorganic salt.

Having described my invention what I claim is:—

1. A composition containing vitamins, inorganic salts and endocrine gland substance.

2. A pharmaceutical composition comprising a mixture of substances rich in vitamins, including vitamins A and C, with assimilable inorganic salts and endocrine gland substance.

3. A composition containing vitamins, including vitamins A and C, calcium lactate, tri-calcium phosphate, sea salt and endocrine gland substance.

4. A composition of matter containing an endocrine gland substance, yeast extract, milk powder, fruit juice, and assimilable inorganic salts including an iodide.

5. A composition comprising concentrated foodstuffs rich in vitamins and endocrine gland substance containing hormones.

6. A composition comprising concentrated food-stuffs rich in vitamins, endocrine gland substance and iodine salt containing hormones.

7. A pharmaceutical composition comprising a mixture of substances rich in vitamins, including vitamins A, B and C, with assimilable inorganic salts and endocrine gland substance.

8. A composition containing vitamins, including vitamins A, B and C, calcium lactate, tri-calcium phosphate, sea salt and endocrine gland substance.

In testimony whereof, I have signed my name to this specification.

ROBERT K. PRINCE.